(12) United States Patent
Pfeffer et al.

(10) Patent No.: US 10,346,868 B2
(45) Date of Patent: Jul. 9, 2019

(54) GIFT EXCHANGE PLATFORM

(71) Applicant: Ogwee, Inc., San Francisco, CA (US)

(72) Inventors: Elery Pfeffer, Brookline, MA (US); David Parkes, Cambridge, MA (US)

(73) Assignee: Nift Networks, Inc., San Francisco, CA (US)

( * ) Notice: Subject to any disclaimer, the term of this patent is extended or adjusted under 35 U.S.C. 154(b) by 191 days.

(21) Appl. No.: 14/594,029

(22) Filed: Jan. 9, 2015

(65) Prior Publication Data

US 2015/0199703 A1 Jul. 16, 2015

Related U.S. Application Data

(60) Provisional application No. 61/926,208, filed on Jan. 10, 2014.

(51) Int. Cl.
*G06Q 30/02* (2012.01)
(52) U.S. Cl.
CPC .............................. *G06Q 30/0226* (2013.01)
(58) Field of Classification Search
None
See application file for complete search history.

(56) References Cited

U.S. PATENT DOCUMENTS

| 7,324,962 | B1 * | 1/2008 | Valliani | G06Q 30/00 705/14.13 |
| 2006/0036503 | A1 | 2/2006 | Schweier et al. | |
| 2008/0015938 | A1 * | 1/2008 | Haddad | G06Q 20/387 705/14.38 |
| 2012/0022930 | A1 | 1/2012 | Brouhard | |
| 2013/0159077 | A1 * | 6/2013 | Stringfellow | G06Q 30/02 705/14.16 |
| 2013/0262227 | A1 * | 10/2013 | Lin | G06O 30/0224 705/14.53 |

FOREIGN PATENT DOCUMENTS

| JP | 2002-042251 A | 2/2002 |
| JP | 2004-213369 A | 7/2004 |
| JP | 2010-250363 A | 11/2010 |

OTHER PUBLICATIONS

"When consumer care about being treated fairly: The interaction of relationship norms and fairness norm" (Pankaj Aggarwal and Richard P. Larrick—published on Jan. 24, 2011).*
PCT International Search Report and Written Opinion, PCT Application No. PCT/US2015/010911, dated Apr. 23, 2015, twelve pages.

* cited by examiner

*Primary Examiner* — James M Detweiler
(74) *Attorney, Agent, or Firm* — Fenwick & West LLP

(57) ABSTRACT

A gift exchange platform assigns gifts to individuals in a network of businesses. Each of the businesses offers a set of gifts available for assigning by other businesses or individuals. The gift assignment system receives the set of offered gifts and gift transaction data describing the gifts in a time interval. A fairness score for each business is calculated based on the comparison of the inbound and outbound scores of the business reflecting the value provided by the business and received by the business of gifts. A request is received from a business, individual or an automated gift system to assign a gift to an individual. A gift and a gift offering business are assigned to an individual based on the fairness score of the assigned business. The gift assignment further accounts for an expected value of an individual to the business on redemption of the gift by the individual.

30 Claims, 10 Drawing Sheets

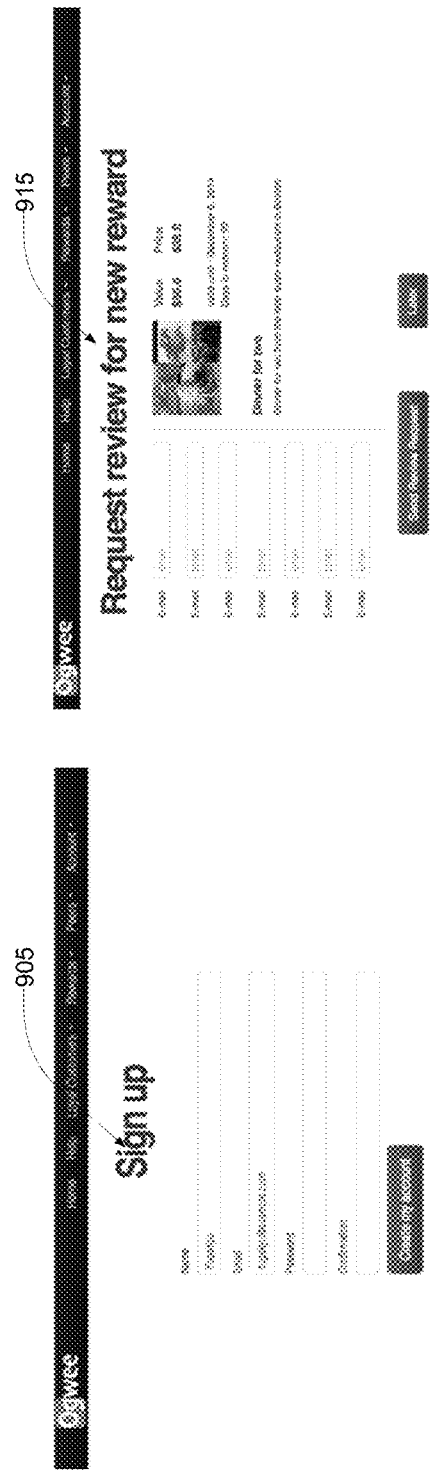
FIG 9A
FIG 9B
FIG 9C
FIG 9D

GIFT EXCHANGE PLATFORM

RELATED APPLICATIONS

This application claims the benefit of U.S. Provisional Application No. 61/926,208, filed Jan. 10, 2014, the entire contents of which are hereby incorporated by reference in its entirety.

BACKGROUND

This disclosure relates generally to automating selection of gifts, and more specifically to managing fairness as a result of gift purchase and redemption.

Customer-centric businesses devise marketing strategies to obtain new customers and to maintain existing customers. Businesses generally reach out to customers via direct marketing such as advertising their products and services, which may include providing deals or discounts on their products or services via email or other electronic communication. Many direct marketing efforts have low response rates, since customers tend to view it as spam. Deals and discounts may get more attention, but may generate "one-time" customers, and if used too frequency can lower a company's perceived value. While loyal customers are often gifted with discounts or gifts by a business, those discounts and gifts tend to be for the own business' products. Customers may prefer to receive a gift from another business. However, even if a business gifted a customer with another business' product, the purchasing business has little guarantee that the customer will enjoy the other business' product, or that the other business will return the favor. Existing gift networks allow a business to select a gift from a catalog of gifts but without the consideration to fairness on assignment of gifts over the network. Similarly, existing customer loyalty systems select gifts or rewards for customers without consideration to fairness on assignment of rewards over the network.

SUMMARY

A gift exchange system permits a business to provide customers with gifts offered by other businesses and offer a gift for other businesses to purchase for a customer of the other business. The gift exchange system assigns gifts for a business to purchase that is based on the expected value of a customer to a business as well as fairness in businesses receiving the customers associated with gifts. The gift exchange system predicts the number of gifts that a business will purchase from other businesses, and recommends gifts to fairly provide that business with purchased gifts for its products and services. Thus, the gift exchange system allows a first business to buy a product from a second business to present it as a gift for a customer of the first business. The businesses can offer gifts for purchase by other businesses as well as purchase gifts offered by another business. When a business requests a gift for one of its customers, the gift exchange system generates one or more recommended gifts for the business to select to gift its customer from an available list of gifts in the system. The gift assigned to the customer may be redeemed later by the customer. The payment for the gift may be made on assignment with an option of refund to the business if the gift is not redeemed, or the payment may be made on redemption of the gift.

To generate recommended gifts and provide fairness in the gifts process, the gift exchange system may generate assignments using estimates of the volume of request for gift assignments from businesses. The gift exchange system may train computer models to estimate information used to improve a fairness measure in the gifts purchased by a business compared to the gifts redeemed at the business. The computer models may estimate: a number of gifts bought by a set of businesses for a set of customers in a time interval, a number of gifts bought for a customer in the same time interval, and a probability of a customer redeeming a gift assigned to the customer. Information related to gift redemption for a business is used to calculate an inbound score for each business. Information related to purchase of gift by a business is used to calculate an outbound score for each business. The gift exchange system may receive information used to improve a fairness score in the gifts requested by a business compared to the gifts redeemed at the business, for example, information from a business about the volume of gifts it expects to request over a future time interval.

These inbound scores and outbound scores are used to calculate a fairness score for the businesses. A fairness score in one embodiment is mathematically represented as a ratio of the number of gifts bought by a business to the number of gifts bought from the business. For example, if each business sends out 2 customers to other businesses as gifts and receives 2 customers from other businesses, the gift distribution has a fairness measure of 1.0. This is fair because there is no trade deficit between the number of customers provided to other businesses and the number of customers received from other businesses. Stated another way, the ratio of received gifts to given gifts (to other businesses) is one. If there is a deficit in receiving customers from other businesses compared to the customers that were sent out or gifted by a business, this is termed a trade deficit for that business. The gifts exchange system generates an assignment of gifts for the customers of the businesses based on the fairness score of the businesses in the network. In a second embodiment, the fairness score may also depend on the value of inbound and outbound customers associated with a business. For example, it may be fair if a business sends out 2 lower value customers and receives 1 higher value customer. In addition, the assignment of a gift may be based on other information such as customer preference and the preference of a business for customers, in addition to fairness considerations.

In one embodiment, the businesses may or may not select the recommended gift assignment for a customer. The system monitors the assignment of gifts by businesses to customers, redemption of gifts by a gifted customer, selection of a non-preferred business gift for a customer, and other such changing features in real time and may maintain and update a tentative assignment of gifts for customers. The system may assign a customer with a choice of gifts, allowing the customer to select one gift.

By estimating likely purchases and redemptions, fairness can be effectively established and maintained for businesses. Without confidence that the system will be fair, a business is unlikely to use a gifts strategy that uses other businesses or relies on other businesses to purchase gifts for that business in return.

In other embodiments, a gift may be requested by an individual rather than a business e.g. given by an individual to a friend, and a business may request a gift for an individual other than its own customer, for instance to assign a gift to an employee or to spend money on gifts irrespective of the individual assigned the gift in order to in return receive incoming customers through assignment of its own gifts.

BRIEF DESCRIPTION OF THE DRAWINGS

FIGS. 9A-9G show exemplary user interfaces for a business to create an account, design gifts, request review of gifts, request gifts for customers and view customer feedback on the assigned gifts via the gift exchange platform according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
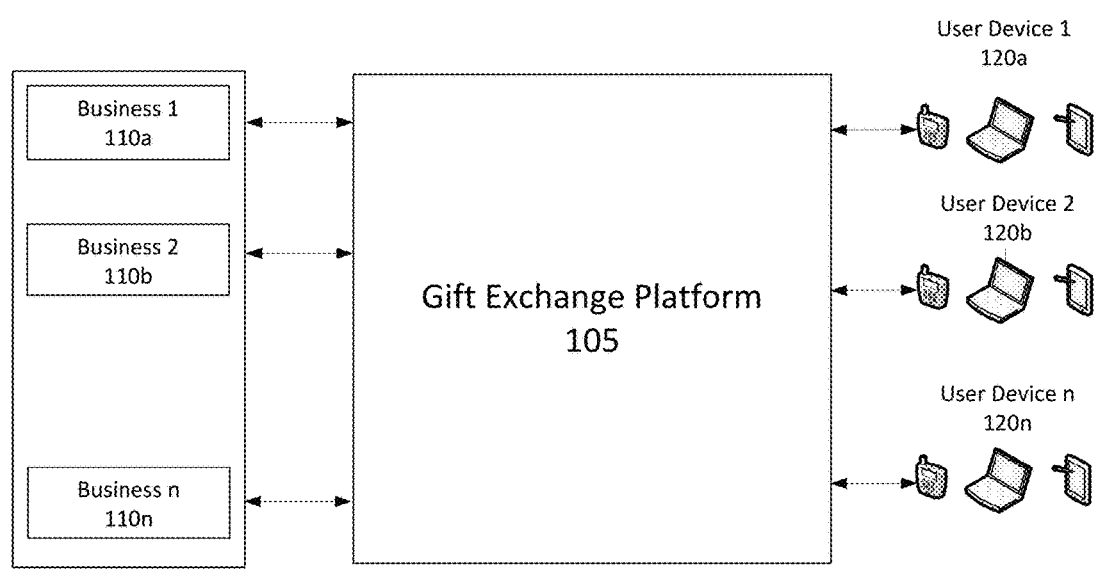
FIG. 1 shows an embodiment of a system for providing a gift exchange platform between businesses.

FIG. 1 shows an embodiment of an environment 100 including a gift exchange platform 105 between businesses. FIG. 1 includes user devices 120a, 120b and 120n (referred to generally as user device 120), businesses 110a, 110b and 110c (referred to generally as businesses 110), and a gift exchange platform 105. Three user devices and businesses are shown for the purpose of illustration; in practice any number of user devices may be present in the environment. Similarly, other modules or components described and illustrated throughout may include single or multiple instances as appropriate to the needs of the environment without loss of generality.

The gift exchange platform 105 permits a business 110 to provide customers with gifts offered by other businesses 110 and offer a gift for other businesses 110 to purchase for a customer of their business 110. That is, a first business 110 (generally a requesting business) can request or purchase a product offered by a second business 110 (generally an offering business) to send it as a gift to the customer of the requesting business 110. Each business may operate as a requesting business and as an offering business depending on which side of a gift transaction the business is on.

In addition to permitting businesses to request gifts, the gifts exchange platform 105 maintains fairness in gifts selection and assignment to ensure that businesses receive similar value in incoming individuals to the value given to other businesses. That is, each requesting business provides a benefit to another business when it requests a gift, and each offering business receives the benefit when its gift is purchased. The gifts exchange platform 105 assigns gifts for a transaction based on the benefits that have been sent and received by each business. Thus, the gifts exchange platform 105 seeks to maintain fairness by achieving a balance of outgoing and incoming benefits for each business. In this way, the businesses 110 that send a gift may expect to have its gifts purchased. Thus, a business 110 may not only gift its customers, but receive new customers from the gifts exchange platform 105 in return.

The businesses 110 may purchase gifts for its customer and offer gifts for purchase by other businesses for their customers via the gift exchange platform 105. The businesses 110 and its customers may communicate with the gift exchange platform 105 via a user device 120, for example to provide a customer the gift to be redeemed at an offering business, or to provide an offering business confirmation of the purchased gift. Exemplary user devices include electronic devices with internet capability like mobile phones, tablets, and desktop and laptop computers.

Figure 2:
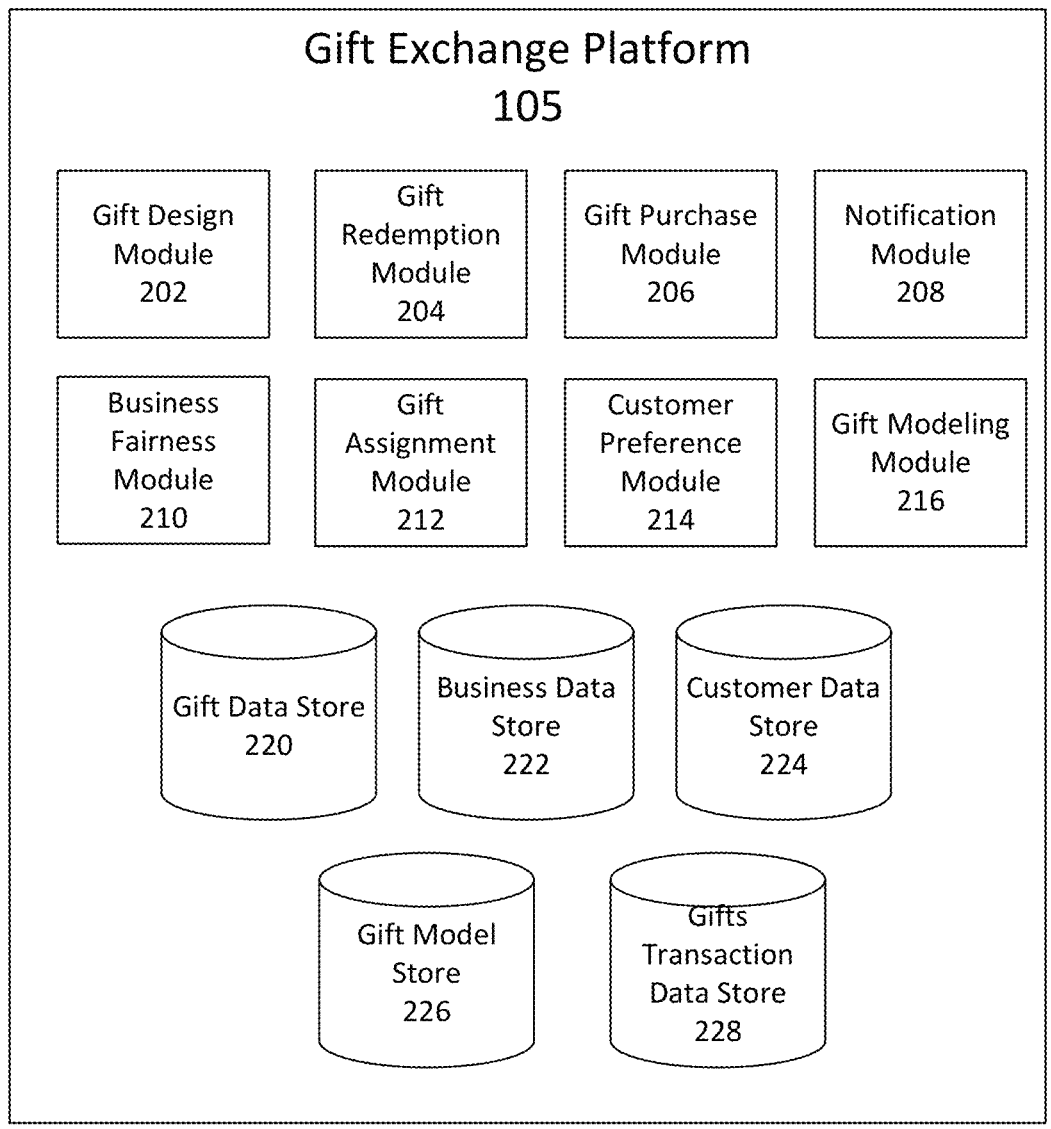
FIG. 2 shows components of a gift exchange platform according to an embodiment.

FIG. 2 shows the components of the gift exchange platform 105 in one embodiment. The gift exchange platform 105 allows businesses to purchase gifts from other businesses for their customers. The gift exchange platform 105 recommends gifts for a business to assign to its customers, and assigns gifts for each customer based on the recommendations. The gifts recommendation accounts for customer preferences and fairness amongst gifting and requesting businesses. In this embodiment, the gift exchange platform 105 includes a gift design module 202, a gift redemption module 204, a gift purchase module 206, a notification module 208, a business fairness module 210, a gift assignment module 212, a customer preference module 214, and a gift modeling module 216. The gift exchange module also includes various data stores, including a gifts data store 220, a business data store 222, a customer data store 224, a gift model store 226, and a gifts transaction data store 228.

Various additional features and functions are not shown for clarity of illustration. For example, the various modules and data stores may be disposed on a plurality of servers and database storage systems. The gift exchange system 105 may also include load balancers, firewalls, and so forth as known in the art.

The various data stores are described first to provide additional context for the data used by gift exchange platform 105, followed by the modules interacting with and manipulating this data.

Gifts data store 220 maintains data relating to gifts offered by the businesses. Each gift may be associated with one or more businesses offering the gift, a gift product description, a price of the gift, an expiration date of the gift and a number of days available to redeem the gift. Certain information for a gift may be specific to individual businesses, for example two businesses may differ in the expiration date of a gift. Multiple businesses may offer the same gift, for example a set of consumer products. Some businesses may offer a discount on the price of the gift.

The business data store 222 and customer data store 224 store data relating to businesses and customers of those businesses, respectively. This data may include received from external sources like social media or data received from a third party entity. The business data store 222 may store data including, among other business information, name, address, email, list of customers, number of gifts bought for each customer, number of gifts bought from each business, a date and time associated with gifts, number of gifts offered by the business, customer preferences, gifting business preferences, and so forth. The customer data store 224 may include, among other customer features, name, email, address, first name, last name, marital status, income ranges, company address, hobbies, business preferences, business category preferences, number of gifts received from different businesses, number of gifts redeemed from different businesses, date and time associated with gifts, etc.

A gifts transaction data store 228 stores gifts transactions. Each gifts transaction describes a customer, a purchasing business (i.e. the business that requested a gift to be assigned and the assigned gift has now been redeemed and purchased), a specific gift, and a redeeming business (i.e. the business that offered a gift and the gift has now been redeemed and purchased) for the gift. The gifts transactions may have various states, such as assigned, pre-assigned, redeemed, and expired. An assigned gift is a gift of an offering business that has been assigned to an individual from a requesting business, and is sent to the individual for redemption. The assigned gift is eligible for the customer to redeem at the offering business. If the customer redeems the gift within a period of time, the gift is redeemed, or the gift may expire after a period of time and the requesting business may have no obligation to pay or is reimbursed if the gift is already paid for. A pre-assigned gift is a gift that the gift exchange platform has tentatively assigned, in advance of a request by a business, to a customer. A pre-assignment provides guidance as to the assignment in the event of a request.

The gift model store 226 maintains computer models that predict gifts transactions. As described further below, the computer models may predict the number of gifts purchased by businesses, the customers that the gifts are purchased for, and other expected gifts activity.

The businesses can further design gifts, request gifts, redeem gifts and review the dashboard via the gift exchange platform 105 by interacting with the various modules as described below.

The gift design module 202 provides an interface for businesses to design gifts, review, edit, activate or decline gifts. The gift design may include setting details of the gift, such as described with respect to the gifts data store 220 above. Gifts created by a business are stored in the gifts data store 220. The gift design module 202 further allows a designed gift to be sent out for review and receive comments and feedback on the gift design. On receiving the feedback, the gift designer edits, activates or deletes the gift. The gift activation request is sent to the gifts data store 220 to permit the gift to be selected for a customer. The gift design module 202 may provide analysis of the designed gift. The analysis may include a measure of desirability of the gift, inbound traffic by week, similar gifts available, status of unredeemed gifts, statistics for number of gifts purchased, and other such analysis.

A customer may redeem a gift assigned for them by a requesting business at the offering business. The gift redemption module 204 allows a customer to redeem a gift within the expiration time of the gift. The gift redemption module 204 may allow the customer to provide feedback for the redeemed gift via various social media entities. The data associated with gift redemption is sent to the gifts transaction data store 228 and may also be transmitted to the customer preference module 214 to update customer preferences stored in customer data store 224.

The gift purchase module 206 allows businesses or individuals to purchase a gift offered by an offering business for customers of the purchasing business. While gifts are generally described herein as purchased for customers of the purchasing business, the gifts may be purchased for any individual, including an individual who may not be a customer of the purchasing business. In an embodiment, the gifts may be purchased by individuals and need not be a business or itself offering a gift through the gift exchange platform 105. In one embodiment, the assigned gift (or a selection of possible assigned gifts) is the only gift available for a purchasing business to purchase for a customer.

The gift purchase module 206 may receive a request for a gift directly from the business or individual purchasing the gift, or the gift purchase module 206 may receive requests from an automated gifts system. The automated gifts system may be a separate system from the gift exchange system 105, or may be incorporated into the gift purchase module 206. The automated gifts system receives information from a business and determines individuals to gift for the business. This determination may be based on a budget set by a business. The budget may indicate, for example, an amount of spending on gifts for a time interval. The information from the business may also include, for example, a list of individuals or a set of characteristics for individuals of interest to the business. The automated gifts system determines when and whether to issue gifts for individuals on the list or that match the set of characteristics. As an example, the automated gifts system may receive a list of individuals and a budget of $500 per month to spend on gifts. The automated gifts system generates requests for gifts to individuals on the list until the $500 budget is reached each month. In this way, a business may use the automated gifts system for marketing, as the gifts it provides to the individuals it refers to other businesses will improve its fairness score and because the business will receive customers in return.

When a request to purchase a gift for a customer is received by the gift purchase module 206, the request to purchase a gift, the requesting business, and the customer are sent to the gift assignment module 212 to identify a gift for the request. Once the gift is selected for purchase, the gift purchase module 206 collects payment information from the requesting business. The notification module 208 notifies the customer that a gift has been assigned to the customer and provides instructions for redeeming the gift. The data associated with gift purchase and customer notification is added to the gifts transaction data store 228.

The notification module 208 may notify customers via a mail server or customer relationship management system, or other system for providing notifications to customers. The notification module 208 may also handle transactional and marketing communication via email between the gift exchange platform 105 and the businesses and customers. For example, to notify the customer of a gift, request customer feedback for a redeemed gift, recommend a gift to a business for its customer, and other related communications. If the customer has not redeemed the gift, the notification module 208 may send a reminder to redeem the gift before its expiry.

The gift assignment module 212 assigns a gift for a gift transaction requested by a requesting business. The gift transaction indicates a customer and a requesting business. The gift assignment module 212 selects a particular gift and an offering business for the gift. In some embodiments, the gift assignment module 212 also revises gift assignments based on new data in the various data stores. The gift assignment module 212 selects gifts based on various data retrieved from other modules, such as a fairness score from the business fairness module 210, customer preferences and expected value to a business for a customer from customer preference module 214, and models of expected volumes of requests to design gifts from gift modeling module 216. These modules are described in further detail.

The business fairness module 210 generates a fairness score to be considered for selection of a gift for a gift transaction. The fairness score indicates the extent to which a business has received value or provided value to the businesses in the gifts exchange platform 105. The business fairness module 210 generates a fairness score for each business offering and purchasing gifts. The business fairness module 210 generates a fairness score based on an inbound score and an outbound score for a business.

The business fairness module 210 determines inbound and outbound scores for customers of a business to generate the fairness score for a business. The inbound score reflects the value of gifts provided to a business from the gift exchange platform 105 due to the flow of inbound individuals. The outbound score reflects the value of gifts purchased by the business for other businesses due to the flow of outbound individuals. The value of gifts for the inbound and outbound scores may be based on the quantity and price of gifts.

The value of gifts may also be based on data associated with the specific customers of the gifts transactions provided by the system. The value of specific customers of the gift transactions may also be based on data received from an offering business, including information received in the form of an auction between businesses. For example, an offering business may place a bid to express willingness to pay to acquire a customer with particular demographics or to depend on features of the offering business. Thus, customer data in the customer data store 224 is analyzed in some embodiments to determine whether a customer is a high value or a low value customer. The value of a customer may be based on various factors, such as the customer's income level, estimated likelihood of purchasing additional products from the offering business conditioned on the gift being redeemed, overall spending level, and other factors that indicate whether a customer referred to the offering business is likely to provide additional value and be a good referral to the offering businesses. Thus, the inbound and outbound scores may also reflect the quality of customers referred by and to the businesses. Just as a purchasing business that sends high-quality customers may have a higher outbound score, a redeeming business that receives high-quality customers may also have a higher inbound score to reflect the additional benefits that derive from having high-value customers referred to the business.

Using these inbound and outbound scores, the business fairness module 210 determines a fairness score for each business. In an embodiment, the fairness score is based on a ratio of the number of gifts purchased by a business to the number of gifts offered by the business that are purchased by others. For example, business A may purchase gifts from other businesses (e.g. business B and business C) for 2 of its customers, and 2 of the gifts offered by business A are purchased by business D and business E respectively for gifting their customers. This is fair, since the businesses share equal number of customers amongst them. In this example, the fairness score is 1.0. The fairness score may alternatively be a non-ratio score, indicating for example the difference between the outbound score and the inbound score for a business. Thus, a business's outbound score of 5 may be compared with an inbound score of 3, indicating a fairness score of 2. This suggests that the business has provided more value to other businesses than it has received in return.

The fairness score for a business may also incorporate data about the volume of requests that may be made by a business but have not yet occurred. To determine an estimate for the volume of requests, the business fairness module 210 may access a computer model stored at gift model store 226 or access data provided by a business.

The gift modeling module 216 calculates estimates of the volume of gifts requested by and for businesses and these estimates may be used to generate assignments. The gift modeling module 216 trains computer models to estimate a number of gifts requested by a set of businesses for a set of customers in a time interval, to estimate a number of gifts requested for a customer in the same time interval and to obtain a probability of a customer redeeming a gift assigned to the customer. The gift modeling module 216 retrieves data associated with the customers and businesses needed to train the computer models from the various data stores. The computer models may be trained using machine learning algorithms. An estimate of the volume of gifts requested by a business may also come from information provided by the business.

Customer preference module 214 manages customer data in customer data store 224, and in particular may modify customer preferences stored therein. The customer preference module 214 may access a customer management system (not shown) to retrieve customer information and populate customer data store 224. Alternatively, rather than populating the customer data store 224, the customer preference module may access an external system, such as the customer management system, to retrieve customer preferences and other customer data. Customer preferences may be explicitly stated by customers, or may be retrieved from a customer database based on implicit information.

The customer preference module 214 may also provide an expected value of a customer to a business. The expected value of a customer is based on the information provided by businesses for a set of customers, the customer preferences of businesses and customer feedback on redeemed gifts. The businesses may indicate a preference of customers for e.g. a salon business may prefer customers in the age range 60-65 who regularly dye their hair, this preference information may include an estimated lifetime value to the business of the customer in the event that the gift is redeemed. The customers may indicate their preferences of businesses they would like to receive gifts from, e.g. a customer may indicate they like biking, and would be more likely to receive adventure or fitness related gifts. The feedback on redeemed gifts is further used to determine the conversion rate of an individual, which is the probability that a customer will redeem an assigned gift. A high conversion rate may increase the expected value of the customer for a business.

The gift assignment module 212 assigns a gift for a gift transaction requested by a purchasing business. The gift assignment module 212 accounts for fairness between businesses by incorporating the fairness score into the selection of a gift for a customer. The gift assignment module 212 may choose not to assign any gift.

Figure 3:
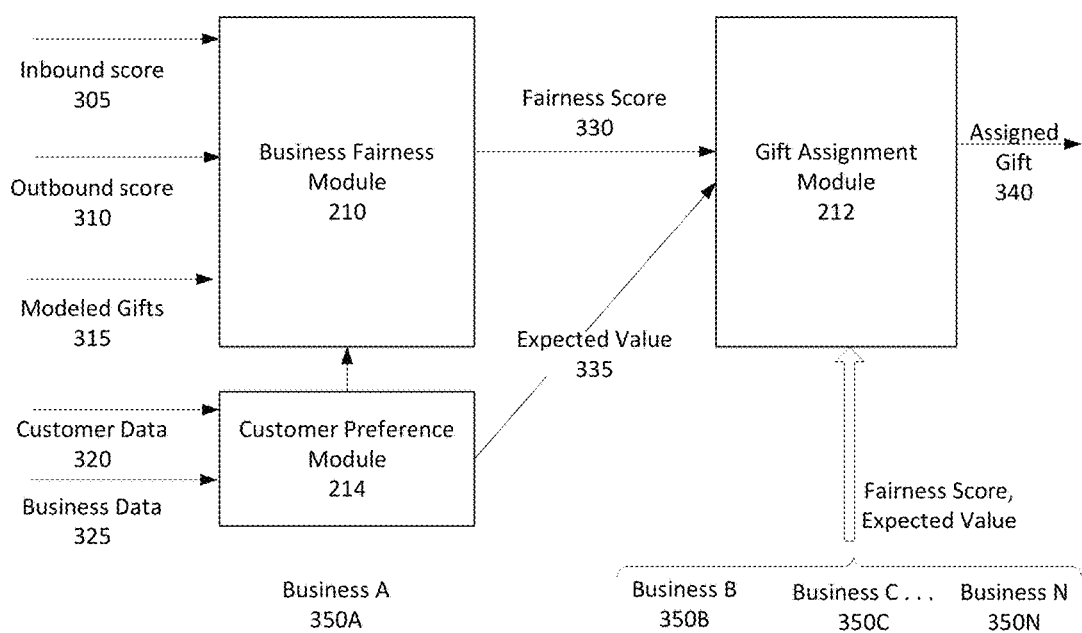
FIG. 3 shows a conceptual example method for assigning a gift for a gift transaction according to one embodiment

FIG. 3 shows a conceptual example method for assigning a gift for a gift transaction according to one embodiment. This example may be performed by components of the gifts exchange platform 105. For each business, the inbound score 305, the outbound score 310 and the modeled gifts 315 are received by the business fairness module 210. In one embodiment, the business fairness module calculates the inbound score 305 and the outbound score 310. The modeled gifts 315 include predicted scores from the computer trained models using gift information and customer information from a past time interval to predict likely gift transactions e.g. the volume of rewards requested by a business for its customers. The business fairness module 210 incorporates these scores to generate the fairness score 330 for a business. In addition, the gift transaction may also specify a customer to be gifted. The customer is provided to the customer preference module 214 to determine an expected value to a business for providing the customer to that business. That is, this particular customer may be a relatively better or worse customer for the business. The customer preference module 214 assesses customer preferences and business preferences based on the customer data 320 and business data 325 to determine an expected value 335 for the customer. The business preference features may include location, margins, customer demographics, business type, hours, and business size. A business may prefer a different value for each of the features for different individuals and prospective customers. For example, the data to provide rank order preferences on individuals for representing its value for an individual who redeems a gift collected may be obtained through an auction held between competing offering businesses.

The fairness score 330 and expected value 335 are generated for the business and received by the gift assignment module 212. In addition, the fairness score and expected value are determined for additional businesses, such as business 350B through business 350N.

The gift assignment module 212 uses the fairness score and the expected value to make an assignment of a gift. The gift assignment module 212 may combine the fairness score and expected value for a business and select the business that has the highest combined score. In this way, the gift assignment module 212 can account for fairness to a business as well as the expected benefit to the business of an assignment.

Figure 4:
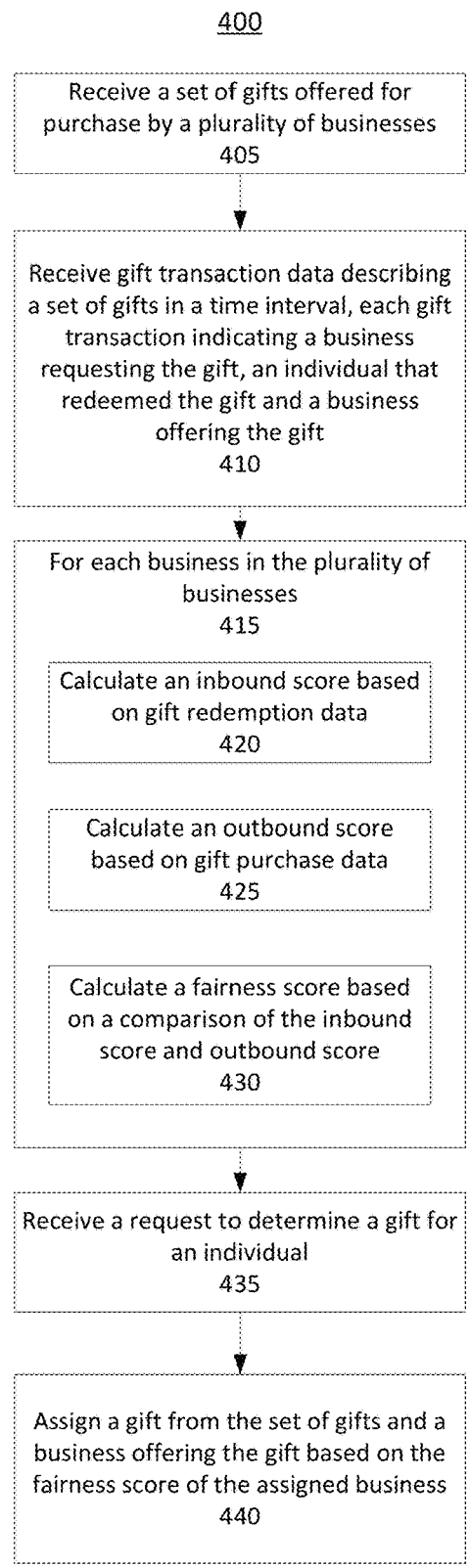
FIG. 4 shows an example method for assigning a gift to an individual based on the fairness score of a business.

FIG. 4 shows an example method 400 for assigning a gift to an individual based on the fairness score of a business. This example method may be performed by components of the gift exchange platform 105. The gift exchange platform 105 receives 405 a set of gifts offered for purchase for gifting an individual by one or more of the plurality of businesses and receives 410 gift transaction data in a specific time interval. The gift transaction data includes information describing the set of gifts. For each gift, the information includes the business purchasing the gift in the case that the gift was requested by a business, a customer that redeemed the gift and a business that offered the gift. The gift information may be for a past time interval, e.g. data from the last two months for each gift or may be for a current time interval, e.g. data from the last hour for each gift. This data from the past time interval may be used as a feature set for training machine learning models for prediction of scores for fairness calculations.

For each business in the plurality of businesses 415, an inbound score 420, an outbound score 425 and a fairness score 430 is calculated. While described as separate scores, in one embodiment the fairness score 430 do not expressly calculate separate inbound and outbound scores. As noted above, the inbound score 420 is based on the gift redemption data for each business, e.g., the inbound score may be a count of the number of gifts redeemed by individuals for a business in the last two months. The outbound score is based on the gift purchase data for each business, e.g. the outbound score may be a count of the gifts purchased by a business to gift its customers or other individuals in the last two months. As indicated above, the fairness score is based on the comparison of the inbound and outbound scores, e.g., the fairness score may be a number indicating the difference between the inbound score and the outbound score for a business. Thus, in one example, if the inbound and outbound scores are determined based only on the number of gifts and if the inbound score is 3 and the outbound score is 5, the fairness score would be 2 and indicate that the business should receive 2 more gifts to be fair. The fairness score may also depend on the estimated value associated with customers. For example, it may be fair for a business to originate two low value customers in return for receiving one high value customer.

The gift exchange platform 105 receives a request to determine a gift for an individual. Though shown here as occurring after calculating the fairness scores, in various configurations the fairness scores may be determined after receiving a request to determine a gift. The request is provided by a business, individual or an automated gift system. The automated gift system makes decisions that may be guided based on a budget received from a business that indicates a maximum limit for spending on customer acquisition for a business by assigning gifts to individuals on behalf of the business. The automated gift system decisions may be further guided based on business preferences for gifting individuals and a list of individuals who may receive gifts. In one embodiment the purchased gifts need not be assigned to customers of the originating business but to other individuals in the system. The gift exchange system 105 assigns 340 a gift from the received set of gifts and a business offering the gift based on the fairness score of the offering business. In some embodiments, the assigning of gifts may be further based on expected value of the customer to the business offering the gift. The assignment of gifts may also include determining the gift preferences of individuals. In some embodiments, rather than assigning each gift individually, gifts to a plurality of individuals are assigned at the same time. In this example, the fairness scores of other businesses are used to obtain a globally optimal solution for assigning gifts as the plurality of gifts are assigned. For e.g., business A's customers may prefer gifts from business B and business B's customers may prefer gifts from business C. Business A may have a high expected value from customers of business B. The flow of customers by gift assignments between A, B and C is determined in a manner where the customer and business preferences are met without compromising on the fairness of every business. Business B may want to gift its customers with business C, but for fairness purposes, unless business A purchases gifts from business B, business B may not be able to gift its customers with gifts from business C.

In one embodiment, the trained computer models at the gift model store 226 are used to calculate a trade deficit for the businesses. The gift assignment module 212 performs an assignment of gifts for the customers of the businesses based on the trade deficit of the business and the associated customer preferences that are stored in the customer data store 224.

In one embodiment, a business may choose not to select the recommended gift assignment for a customer. Alternatively, the gift assignment model may suggest a choice of gifts to be assigned to a customer and allow a requesting business to make a choice of gift. In another embodiment, the gift exchange platform may offer a choice of gifts to an individual. The assignment encourages fairness by selecting gifts based on the fairness score of offering businesses. The gift assignment module 212 receives the actual assignment of gifts by businesses for its customers, redemption of gifts by a gifted customer, selection of a non-preferred business gift for a customer, and other such changing features in real time and revises the assignment of gifts based on actual gifts selected by a business, actual frequency that gifts are requested, and other gift transaction data, as further described below.

Figure 5:
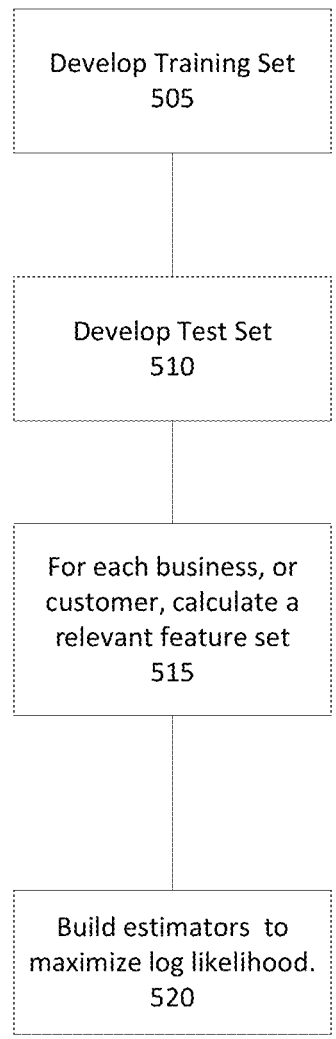
FIG. 5 shows an example method for training a model required by the gift exchange system for assigning gifts according to an embodiment.

FIG. 5 shows an example method for training a predictive computer model by the gift exchange platform 105 for assigning gifts according to an embodiment. The model estimates follow a similar method of training a model for estimating the number of gifts requested by every business, the number of gifts requested for every customer, the probability of a set of businesses requesting gifts for a set of customers, and the probability of customers redeeming the gift assigned for them. A training set is developed 505 for a specific time interval T using historical behavioral data related to a feature set. The training set includes previous gift transactions and business information, indicating for example which businesses purchased gift and for which customers. A test set is developed 510 for a corresponding time interval in history. For e.g. a time interval in history may be 1 year, and two different businesses may have a joining date of t1 and t2 respectively. The time interval T' for the test data set would be [t1−1 year, t2−1 year], i.e. the same time interval last year. The database is divided 415 to contain all records that were created in the time interval T'. For every model, the method next calculates 515 a relevant feature set to use for querying the database that includes business and customer data.

The feature set for each business in estimating the volume of gifts requested by the business may include zip code, city, county, years in business, street, a number of gifts requested in each of (1) the same interval last year, (2) the same interval of equal length as T' immediately preceding T', and (3) an interval equal to T. These features may be determined for each business and include a category of the business.

The feature set of the estimation of the number of gifts requested for each customer in the time interval T may include Email (or an email domain), Address, City, State, ZIP Code, First Name, Last Name, Combined Adult Age, Marital Status, Estimated Household Income Ranges, Number Of Adults In Household, Adults Dwelling Type, number of gifts purchased for the customer in each of (1) the same interval last year, (2) the same interval of equal length as T' immediately preceding T', and (3) an interval equal to T'. The customer features may also include customer preferences on business categories. The customer preferences may be updated with the data received in regard to which gifts are redeemed by the customer.

The feature set for estimation of the probability of customers redeeming the gift assigned includes the probability of a set of businesses requesting gifts for a set of customers in the time interval T.

A set of estimators are built 520 as candidates for each model. Each estimator provides a different method for making a prediction. For example, the set of estimators may include linear model trees, random trees, Gaussian mixture model, decision trees, and so forth that use the feature set to predict the output. The estimators are trained and then applied to the test data set to determine a prediction, which can be compared against the actual results of the test data set. In the case of probabilistic models, the log likelihood of each model on the test data set can be computed and the estimator with the maximized log likelihood is selected. In other cases standard approaches such as minimizing complexity-penalized predictive accuracy can be adopted.

In one embodiment, the calculation of fairness scores may be performed prior to receiving requests to assign a gift, and may be performed with the expectation of the volume of gifts requested by businesses in a future time interval. The advance calculation may reduce the burden on the gift exchange system when requests are received or during periods of heavy load. The assignment of gifts to individual may depend on a combination of the estimated value to the offering business of the individual along with the fairness scores, including fairness scores of both the requesting business and the offering business. For example, the determination may depend on a linear combination of the estimated value and the fairness scores of requesting and offering business.

In one configuration, a pre-assignment of gifts may be performed prior to receiving requests to assign a gift, and may be performed with the forward-looking expectation of the volume of gifts requested by businesses. This advance assignment may permit the gifts to be calculated prior to requests, thereby reducing the burden on the system when requests are received or during periods of heavy load. To perform this forward-looking assignment, the gift assignment module further calculates a trade deficit for all the businesses indicating the number of gifts to be received by that business. A trade deficit is defined as the number of gifts a business will need to receive such that fairness between businesses is achieved. Thus, the trade deficit indicates numerically the quantity of gifts required to meet a specified fairness score, such as 1.0.

In this embodiment in which gifts are assigned in advance, the gifts exchange platform may set a maximum fairness score and ensure that assignments result in a fairness score for each business below the maximum fairness score. The fairness threshold may be set, for example, between 2 to 10. The fairness threshold may be set for all businesses in the gifts exchange system, or may be adjusted for individual businesses. For example, businesses may have the fairness threshold raised or lowered based on the quantity and quality of reviews for the businesses' gifts.

Figure 6:
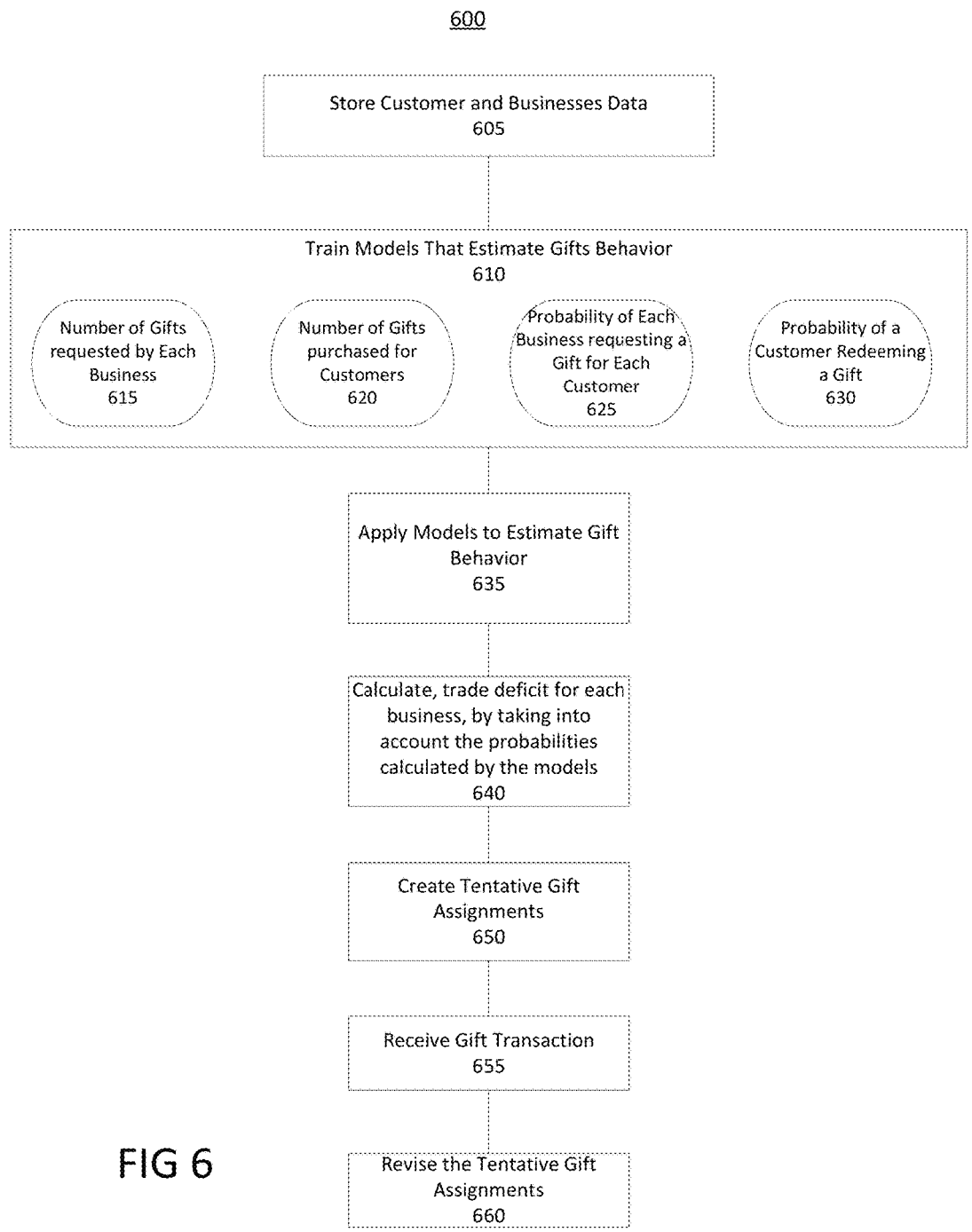
FIG. 6 shows an example data flow diagram for pre-assigning gifts and revising pre-assignment of gifts to customers of all businesses in the gift exchange system according to an embodiment.

FIG. 6 shows an example data flow diagram for pre-assigning gifts in advance and revising pre-assignment of gifts to customers of businesses in the gift exchange platform 105 according to an embodiment. The gift exchange platform 105 receives 605 data associated with businesses and customers and stores it in the database server cluster module. The gift modeling module 216 retrieves data from the various data stores and trains computer models 610 in gift model store 226 to calculate estimates for gift behavior associated with gifts purchased and redeemed. Specifically, the trained models may include a model predicting: the number of gifts requested 615 by every business within a given time interval T, the number of gifts requested 620 for every customer in the time interval T, the probability of a set of businesses requesting 625 gifts for a set of customers in the time interval T, and the probability of customers redeeming 630 the gift assigned to them. To calculate the estimates, the gift modeling module 216 generates a machine learned model using historical behavioral data as a training set. The historical data may include features such as a number of gifts requested by a business for all customers in a time interval T, number of gifts offered by a business assigned in the time interval T, and other such estimation features. The training of models is further described below.

The trained models are further used 635 to calculate 640 a trade deficit for each business in the business data store 222. To calculate the trade deficit, the number of gifts needed to be assigned for each business in time interval T' is determined. The number of gifts that each business offers and has been purchased or is estimated to be purchased in time interval T' is determined. The number of redeemable gifts purchased by each business for its customer for time interval T' is determined. The estimated number of gifts that a business will request in time interval T is determined based on the trained model estimates. Based on the determinations above, a trade deficit value for a time interval T' is determined for each of the businesses. For example, the estimates may indicate that business A will request gifts for 10 customers, each of whom will be assigned gifts in a time interval of 30 days, creating a trade deficit for business A of 10 gifts. Thus it needs to sell 10 offered gifts, i.e. receive 10 customers from other businesses, to reach an even fairness score.

Once the trade deficit is calculated for each business, the customers of each business are pre-assigned gifts. The method of creating 650 gift assignments may be based on the fairness scores as and estimated values as discussed above with respect to FIGS. 3 and 4. In an alternate embodiment, the method of creating gift assignments is customer centric or business centric. This is in the manner of deferred acceptance stable matching, adopting either a "customer selecting" or a "business selecting" stance. The customer centric method of assignment accounts for the trade deficit of each business in a time interval T' and customer preferences for gifts. The business centric method of assignment takes into account the trade deficit of each business in a time interval T' and the business preferences in regard to which gifts to provide for its customers. The assignment of a customer to a gift is described further below.

During the time period for the assignment, the businesses may or may not request that gifts be assigned to particular customers and may or may not accept a proposed assignment. Next, information about a gift transaction is received 655. That information may indicate, for example, a gift purchased for a customer, a change in business or customer preferences, a gift no longer being offered, or an additional gift being offered. The new information may include customer feedback on a redeemed gift, customer or application analytics module 245 feedback on a designed gift, deletion of activated gifts, expiration of active gifts, new business accounts, new customer information, etc. This information tends to affect the expected fairness of the existing assignments.

The assignments are revised 660 to account for the received gift information. The gift may be changed to improve the overall fairness and may provide the business that had been assigned the customer with a new assignment. This revision is further described below.

Figure 7:
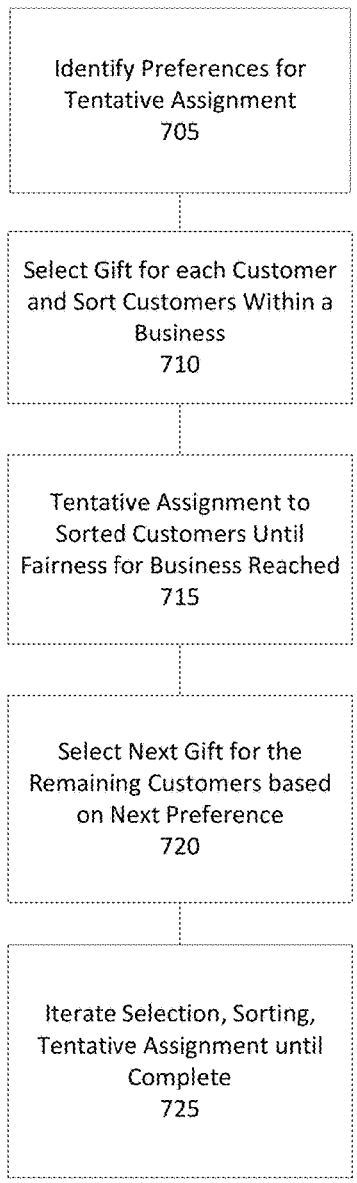
FIG. 7 shows an example method for a pre-assignment of gifts according to an embodiment.

FIG. 7 shows an example method for determining a pre-assignment of gifts according to an embodiment. The gift assignments may be customer centric or business centric. Once the trade deficit of all the businesses is calculated, a gift is selected for the customers. First, preferences are identified 705 for assigning the customers, which may be based on the customer's preferences or preferences provided by businesses for gifting its customers. The customer may provide business preferences that reflect preferences for different gifts, for receiving gifts from or the gift exchange platform may predict the business preferences for a customer based on the customer data stored in the customer data store 224. The businesses may provide customer preferences for receiving gifts or the gift exchange platform may predict the customer preferences for a business based on the business data stored in the business data store 222. Next, customers are added to a preference list for each business based on the preferences 710. At this stage, each business may have an excess or deficit of selections relative to its trade deficit. The customers within the preference list may be further sorted for each business based on the business preferences of the customers. In the business centric method, the customer list is sorted 510 for each business based on the customer preferences of the businesses. Using the preference list, gifts are assigned 715 in the sorted order to the customer list for each business until fairness (e.g., a fairness measure of 1.0) is reached for a business. The additional customers that were sorted to a business but not assigned to it are re-selected 720 based on their next preferences. The gifts for the remaining customers in the list are selected 720 based on at least one of their next preferences. The sorting of customer list, assigning of gifts and selection of subsequent preferences is iterated 725 until either all the offered gifts by businesses are exhausted or all the customers have been assigned gifts.

Figure 8:
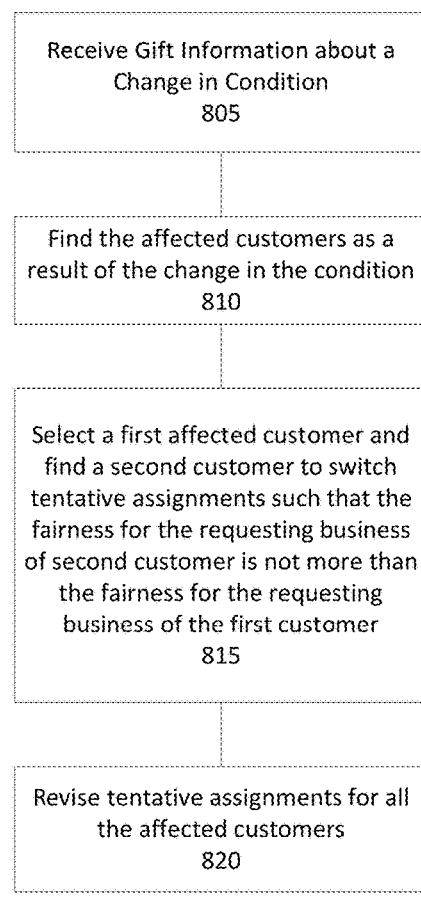
FIG. 8 shows an example method of revising pre-assignment of gifts according to an embodiment.

FIG. 8 shows an example method of revising a pre-assignment of gifts according to an embodiment. The predicted customers may not be selected to receive a gift. In case the businesses selects different customers, or any other new information associated to the businesses or customer is received 805, the gift pre-assignments are revised and recalculated. The new information may include customer feedback on a redeemed gift, customer or application analytics module 245 feedback on a designed gift, deletion of activated gifts, expiration of active gifts, new business accounts, new customer information, etc. The customers that are affected due to the change in data are retrieved 810 from the database server module 220. The affected customers may be, for example, customers for whom a gift was purchased, a customer whose preference changed, and so forth. For example, a customer may be affected when that individual chooses not to redeem an assigned gift.

To maintain the fairness for the offering business that had been assigned, in one embodiment this advance assignment is moved to another customer. A search is conducted to find 815 a second customer in the database such that the gift assignment for the two customers can be switched. The condition for switching is such that the deviation from fairness of the gifting business of the second customer is not more than the deviation from fairness of the gifting business of the first customer. For example, another customer with a pre-assignment to the gift that was actually assigned for the first customer may be switched, such that the second customer is pre-assigned (but not actually used) the gift of the first customer. The advance gift assignments for all the affected customers are revised 820. By identifying affected pre-assignments and performing these switches, the gift exchange platform 105 can accommodate changes during the time period without re-performing the full pre-assignment process while maintaining preferences and fairness for businesses. Alternatively, the full pre-assignment process can be performed to revise assignments in case of a change in data that affects the assignments.

Figures 9E, 9F, 9G:
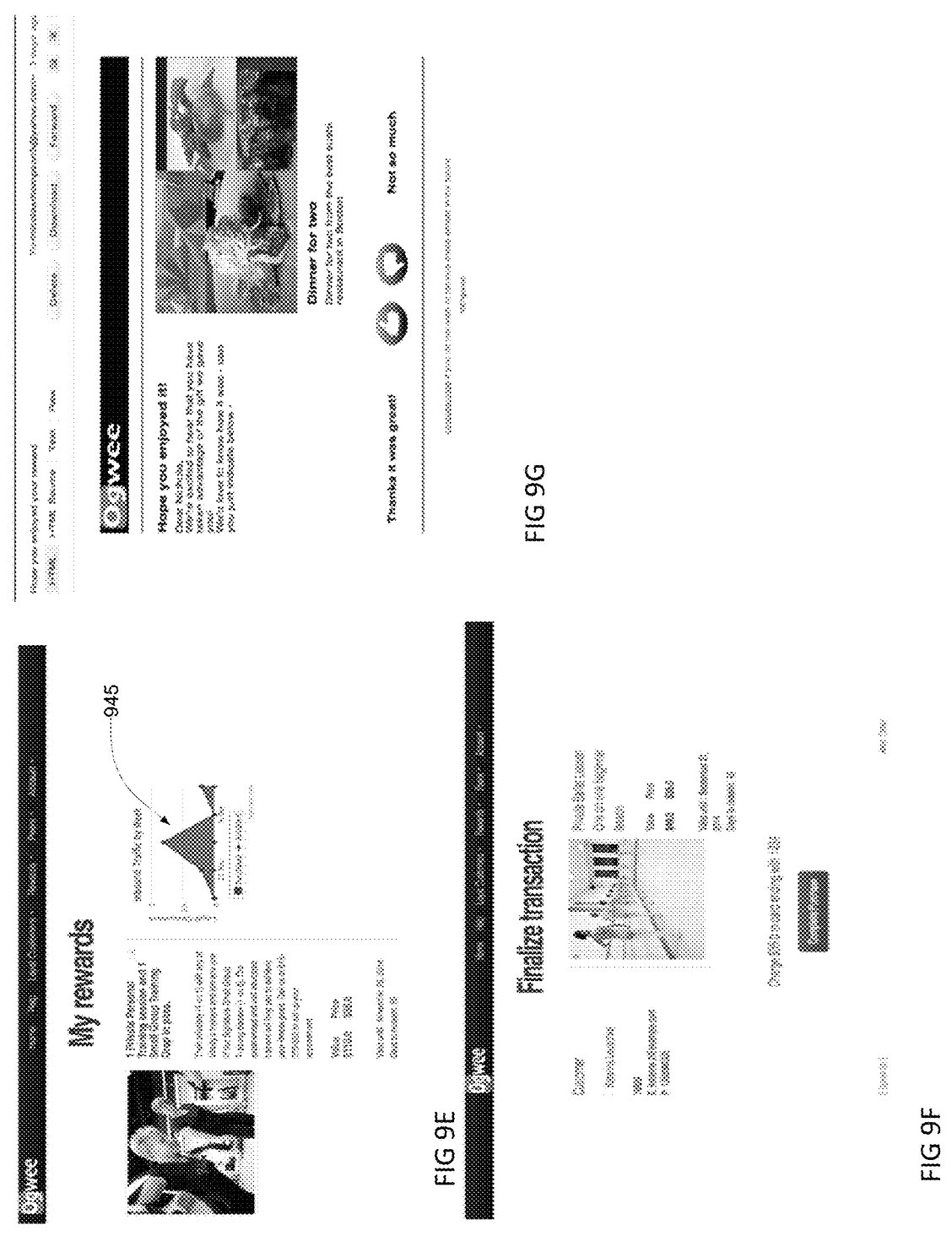

FIGS. 9A-9G show user interfaces for interacting with the gifts exchange platform. FIG. 9A shows an exemplary user interface for use by a business in creating an account with the gift exchange platform. FIG. 9B shows an exemplary user interface for use by a business in designing a gift. The value 912 in FIG. 9B refers to the sticker price of the good or service and is distinct from the estimated value of a customer to a business. FIG. 9C shows an exemplary user interface for requesting the review or feedback of a gift design. FIG. 9D shows an exemplary user interface when a business requests that a gift be assigned to a customer. The suggested gift is provided to the business and in this embodiment the business can confirm the assignment of that gift for the customer. FIG. 9E shows an exemplary user interface for gift analysis of an activated gift that is offered by a business according to an embodiment. FIG. 9F shows an exemplary user interface for use by a business in completion of the design to purchase a gift for assigning it to an individual. There are variations in regard to when payment is made by the requesting business. This could be done on assignment with an option to obtain refund if the gift is not redeemed or the payment can be done when the gift is redeemed by the individual. FIG. 9G shows an exemplary user interface requesting individual feedback via social network or the gift exchange platform 105.

Figure 10A:
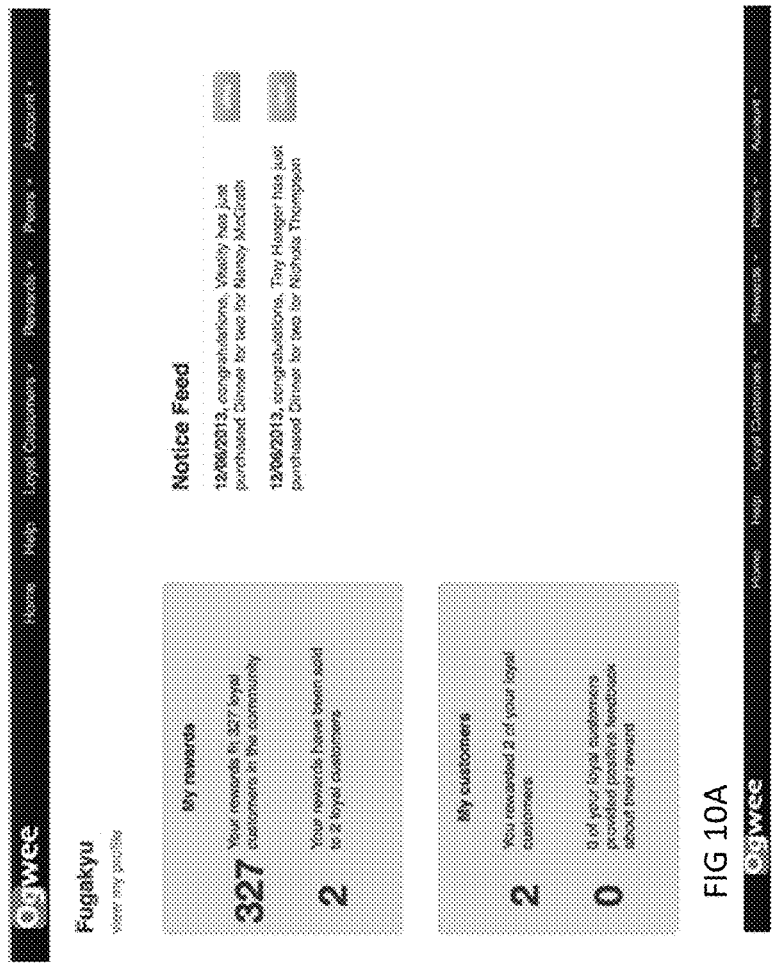
FIGS. 10A-10B show exemplary user interfaces for a dashboard of a business user of the gift exchange platform along with the statistics that can be monitored on the dashboard according to an embodiment.
Figure 10B:
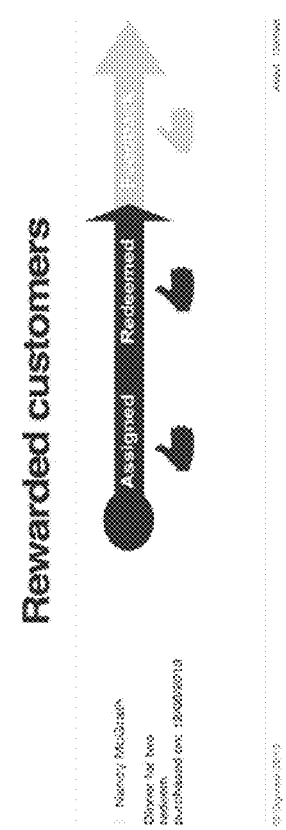

FIG. 10A shows an exemplary user interface of a dashboard of a business user according to an embodiment. FIG. 10B shows an exemplary user interface for a status of a gift according to an embodiment.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for assigning a gift to an individual, the method comprising:
   receiving, by one or more processors, a set of gifts offered by a plurality of businesses, each gift offered by one or more of the plurality of businesses for purchase for an individual;
   receiving, by the one or more processors, gift transaction data describing a set of gift transactions in a time interval, each gift transaction indicating a business or an individual purchasing the gift, an individual that redeemed the gift, and a business offering the redeemed gift;
   for each business of the plurality of businesses:
      calculating, by the one or more processors, an inbound score for the business, wherein the inbound score is at least one of (i) a total number of gifts redeemed at the business, (ii) a total redemption value of gifts redeemed at the business, (iii) a total number of gifts purchased from the business, or (iv) a total price of gifts purchased from the business;
      calculating, by the one or more processors, an outbound score for the business, wherein the outbound score is at least one of (i) a total number of gifts purchased by the business and redeemed at other businesses, (ii) a total redemption value of gifts purchased by the business and redeemed at other businesses, (iii) a total number of gifts purchased by the business, or (iv) a total price of gifts purchased by the business;
      calculating, by the one or more processors, a fairness score for the business,
   wherein the fairness score is (i) a ratio of the outbound score to the inbound score or (ii) a mathematical difference between the outbound score and the inbound score;
   receiving, by the one or more processors, a request to select a gift for an individual;
   calculating, by the one or more processors and using a machine-learned computer model trained by the one or more processors, a predicted conversion rate at which the individual will redeem an assigned gift, wherein the machine-learned computer model is at least one of (i) a linear model tree, (ii) a random tree model, (iii) a Gaussian mixture model, (iv) a decision tree model, or (v) a probabilistic model;
   determining, by the one or more processors, an expected value of the individual based at least in part on the predicted conversion rate; and
   selecting, by the one or more processors and responsive to the request, a gift for the individual from the set of gifts based on the fairness score of the business offering the selected gift and the expected value of the individual.

2. The method of claim 1 wherein the request to select a gift is provided by a requesting business and the individual is a customer of a requesting business and the business offering the gift is not the requesting business.

3. The method of claim 2 wherein selecting the gift is further based on the fairness score of the requesting business.

4. The method of claim 1 wherein selecting the gift is further based on the fairness score of each of the plurality of businesses.

5. The method of claim 1 wherein selecting the gift is further based on a linear combination of the fairness score of the business offering the selected gift and an expected value of the individual to the business offering the selected gift.

6. The method of claim 1 wherein the expected value of the individual is further based on a value determined by an automated auction system that uses bids from offering businesses.

7. The method of claim 1 wherein selecting of the gift includes selecting a choice of gifts for an individual.

8. The method of claim 1 wherein the request to select a gift is provided by a requesting business and the fairness score is further based on receiving data related to the volume of requests from a requesting business to select a gift for a plurality of customers over a future time interval.

9. The method of claim 8 wherein the data related to the volume of requests is provided by at least one of a predictive model or the requesting business.

10. The method of claim 1 further comprising simultaneously selecting one or more other gifts from multiple businesses to other customers, such that a globally optimal solution is obtained for the multiple businesses.

11. The method of claim 10 wherein the optimal solution for the multiple businesses occurs when, for each of the multiple businesses, a ratio of a number of gifts purchased by the business from other businesses in the group of multiple businesses to a number of gifts the business offers that are purchased by other businesses in the group of multiple businesses is equal to 1.0.

12. The method of claim 1 wherein the request to select a gift is provided by an automated gifts system.

13. The method of claim 12 wherein the automated gift system is configured to request a gift based on information received related to a budget for spending on gifts over a time interval.

14. The method of claim 1 further comprising of re-assigning the gift based on purchase or redemption of another gift.

15. The method of claim 1 wherein selecting the gift is further based on preferences associated with the individual and the fairness score associated with each business.

16. A non-transitory computer-readable medium for assigning a gift to an individual, the non-transitory computer-readable medium comprising instructions that cause a processor to perform steps of:
receiving a set of gifts offered by a plurality of businesses, each gift offered by one or more of the plurality of businesses for purchase for an individual;
receiving gift transaction data describing a set of gift transactions in a time interval, each gift transaction indicating a business or an individual purchasing the gift, an individual that redeemed the gift, and a business offering the redeemed gift;
for each business of the plurality of businesses:
calculating an inbound score for the business, wherein the inbound score is at least one of (i) a total number of gifts redeemed at the business, (ii) a total redemption value of gifts redeemed at the business, (iii) a total number of gifts purchased from the business, or (iv) a total price of gifts purchased from the business;
calculating an outbound score for the business, wherein the outbound score is at least one of (i) a total number of gifts purchased by the business and redeemed at other businesses, (ii) a total redemption value of gifts purchased by the business and redeemed at other businesses, (iii) a total number of gifts purchased by the business, or (iv) a total price of gifts purchased by the business;
calculating a fairness score for the business, wherein the fairness score is (i) a ratio of the outbound score to the inbound score or (ii) a mathematical difference between the outbound score and the inbound score;
receiving a request to select a gift for an individual;
calculating, using a machine-learned computer model trained by the processor, a predicted conversion rate at which the individual will redeem an assigned gift, wherein the machine-learned computer model is at least one of (i) a linear model tree, (ii) a random tree model, (iii) a Gaussian mixture model, (iv) a decision tree model, or (v) a probabilistic model;
determining an expected value of the individual based at least in part on the predicted conversion rate; and
selecting, responsive to the request, a gift for the individual from the set of gifts based on the fairness score of the business offering the selected gift and the expected value of the individual.

17. The non-transitory computer-readable medium of claim 16 wherein the request to select a gift is provided by a requesting business and the individual is a customer of a requesting business and the business offering the gift is not the requesting business.

18. The non-transitory computer-readable medium of claim 17 wherein selecting the gift is further based on the fairness score of the requesting business.

19. The non-transitory computer-readable medium of claim 16 wherein selecting the gift is further based on the fairness score of each of the plurality of businesses.

20. The non-transitory computer-readable medium of claim 16 wherein selecting the gift is further based on a linear combination of the fairness score of the business offering the selected gift and an expected value of the individual to the business offering the selected gift.

21. The non-transitory computer-readable medium of claim 16 wherein the expected value of the individual is further based on a value determined by an automated auction system that uses bids from offering businesses.

22. The non-transitory computer-readable medium of claim 16 wherein selecting of the gift includes selecting a choice of gifts for an individual.

23. The non-transitory computer-readable medium of claim 16 wherein the request to select a gift is provided by a requesting business and the fairness score is further based on receiving data related to the volume of requests from a requesting business to select a gift for a plurality of customers over a future time interval.

24. The non-transitory computer-readable medium of claim 23 wherein the data related to the volume of requests is provided by at least one of a predictive model or the requesting business.

25. The non-transitory computer-readable medium of claim 16 further comprising simultaneously selecting one or more other gifts from multiple businesses to other customers, such that a globally optimal solution is obtained for the multiple businesses.

26. The non-transitory computer-readable medium of claim 25 wherein an optimal solution for the multiple businesses occurs when, for each of the multiple businesses, a ratio of a number of gifts purchased by the business from other businesses in the group of multiple businesses to a number of gifts the business offers that are purchased by other businesses in the group of multiple businesses is equal to 1.0.

27. The non-transitory computer-readable medium of claim 16 wherein the request to select a gift is provided by an automated gifts system.

28. The non-transitory computer-readable medium of claim 27 wherein the automated gift system is configured to request a gift based on information received related to a budget for spending on gifts over a time interval.

29. The non-transitory computer-readable medium of claim 16 further comprising of re-assigning the gift based on purchase or redemption of another gift.

30. The non-transitory computer-readable medium of claim 16 wherein selecting the gift is further based on preferences associated with the individual and the fairness score associated with each business.

\* \* \* \* \*